(12) United States Patent
Ito et al.

(10) Patent No.: US 11,535,003 B2
(45) Date of Patent: Dec. 27, 2022

(54) ELECTRICALLY CONDUCTIVE SHEET FOR USE IN THREE-DIMENSIONAL MOLDING

(71) Applicants: LINTEC OF AMERICA, INC., Phoenix, AZ (US); LINTEC CORPORATION, Tokyo (JP)

(72) Inventors: Masaharu Ito, Phoenix, AZ (US); Kanzan Inoue, Phoenix, AZ (US)

(73) Assignees: LINTEC OF AMERICA, INC., Phoenix, AZ (US); LINTEC CORPORATION, Tokyo (JP)

( * ) Notice: Subject to any disclaimer, the term of this patent is extended or adjusted under 35 U.S.C. 154(b) by 93 days.

(21) Appl. No.: 16/464,096

(22) PCT Filed: Nov. 28, 2017

(86) PCT No.: PCT/JP2017/042678
§ 371 (c)(1),
(2) Date: May 24, 2019

(87) PCT Pub. No.: WO2018/097323
PCT Pub. Date: May 31, 2018

(65) Prior Publication Data
US 2019/0297676 A1    Sep. 26, 2019

(30) Foreign Application Priority Data
Nov. 28, 2016 (JP) .............................. JP2016-230553

(51) Int. Cl.
*B32B 5/12* (2006.01)
*H05B 3/10* (2006.01)
(Continued)

(52) U.S. Cl.
CPC ................ *B32B 5/12* (2013.01); *H05B 3/10* (2013.01); *H05B 3/20* (2013.01); *B32B 27/08* (2013.01);
(Continued)

(58) Field of Classification Search
CPC ... H05B 3/10; H05B 3/20; H05B 3/36; H05B 3/16; H05B 3/146; H05B 3/34;
(Continued)

(56) References Cited

U.S. PATENT DOCUMENTS

2002/0040900 A1* 4/2002 Arx ......................... B29C 51/02
219/544
2008/0290081 A1* 11/2008 Biddell .................. A42B 3/245
219/203
2017/0100920 A1    4/2017 Matsumori et al.

FOREIGN PATENT DOCUMENTS

DE          2350461 A1   4/1975
DE   10-2009-032260 A1   1/2011
(Continued)

OTHER PUBLICATIONS

Machine Translation of DE 2350461 A1 (Year: 1975).*
(Continued)

*Primary Examiner* — James C Yager
(74) *Attorney, Agent, or Firm* — McDermott Will & Emery LLP

(57) ABSTRACT

The present disclosure provides an electrically conductive sheet for use in three-dimensional molding including: a pseudo-sheet structure in which plural electrically conductive linear bodies extending unidirectionally are arranged spaced apart from each other; and a resin protective layer provided on a surface of the pseudo-sheet structure. In the above mentioned electrically conductive sheet, each of the electrically conductive linear bodies in the pseudo-sheet structure includes: a first portion formed in a wave pattern having a wavelength $\lambda 1$ and an amplitude A1; and a second portion formed in a wave pattern having a wavelength $\lambda 2$ and an amplitude A2, at least one of which is different from the wavelength $\lambda 1$ or the amplitude A1 of the first portion.

21 Claims, 2 Drawing Sheets

(51) Int. Cl.
*H05B 3/20* (2006.01)
*B32B 27/08* (2006.01)

(52) U.S. Cl.
CPC ... *B32B 2307/202* (2013.01); *Y10T 428/1352* (2015.01); *Y10T 428/1355* (2015.01); *Y10T 428/1359* (2015.01)

(58) Field of Classification Search
CPC ............... H05B 3/145; H05B 2214/04; H05B 2203/013; H05B 2203/014; H05B 2203/037; H05B 2203/003; B32B 5/12; B32B 27/08; B32B 2307/202; Y10T 428/1355; Y10T 428/1352; Y10T 428/1359
See application file for complete search history.

(56) References Cited

FOREIGN PATENT DOCUMENTS

| | | |
|---|---|---|
| JP | 47-5591 B1 | 2/1972 |
| JP | 05-13157 A | 1/1993 |
| JP | 05-032954 Y2 | 8/1993 |
| JP | 2005-116244 A | 4/2005 |
| JP | 2008-077879 A | 4/2008 |
| JP | 2010-073530 A | 4/2010 |
| JP | 2011-210487 A | 10/2011 |
| JP | 2015-182438 A | 10/2015 |
| JP | 2016-091658 A | 5/2016 |
| JP | 2016-143538 A | 8/2016 |

OTHER PUBLICATIONS

Machine Translation of JP H0513157 A (Year: 1993).*
International Search Report issued in corresponding International Patent Application No. PCT/JP2017/042678, dated Jan. 16, 2018, with English Translation.
Extended European Search Report issued in corresponding European Patent Application No. 17873355.6-1202, dated Jul. 2, 2020.
Japanese Notice of Reasons for Refusal issued in corresponding Japanese Patent Application No. 2018-553023, dated Apr. 26, 2022, with English translation.
Japanese Notice of Reasons for Refusal issued in corresponding Japanese Patent Application No. 2018-553023, dated Sep. 6, 2022, with English translation.

* cited by examiner

[FIG.1]
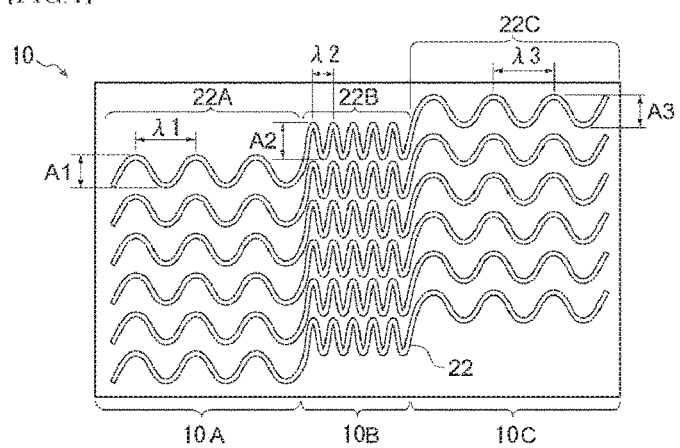
[FIG.2]
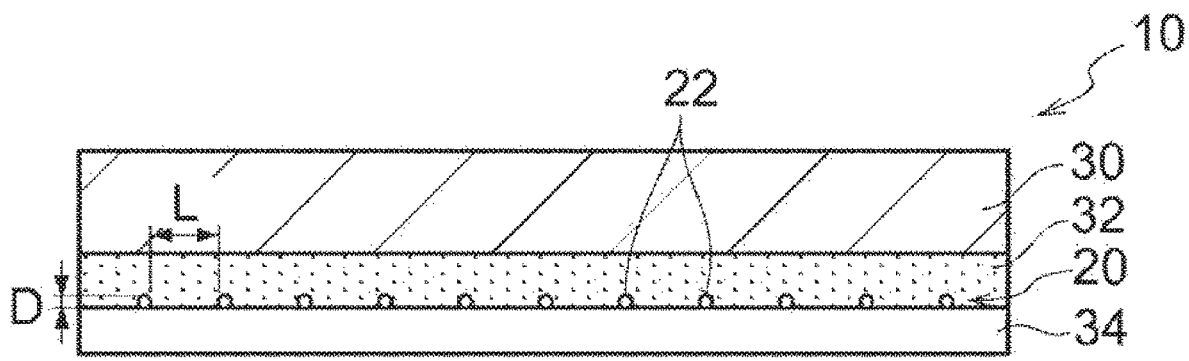

[FIG.3]
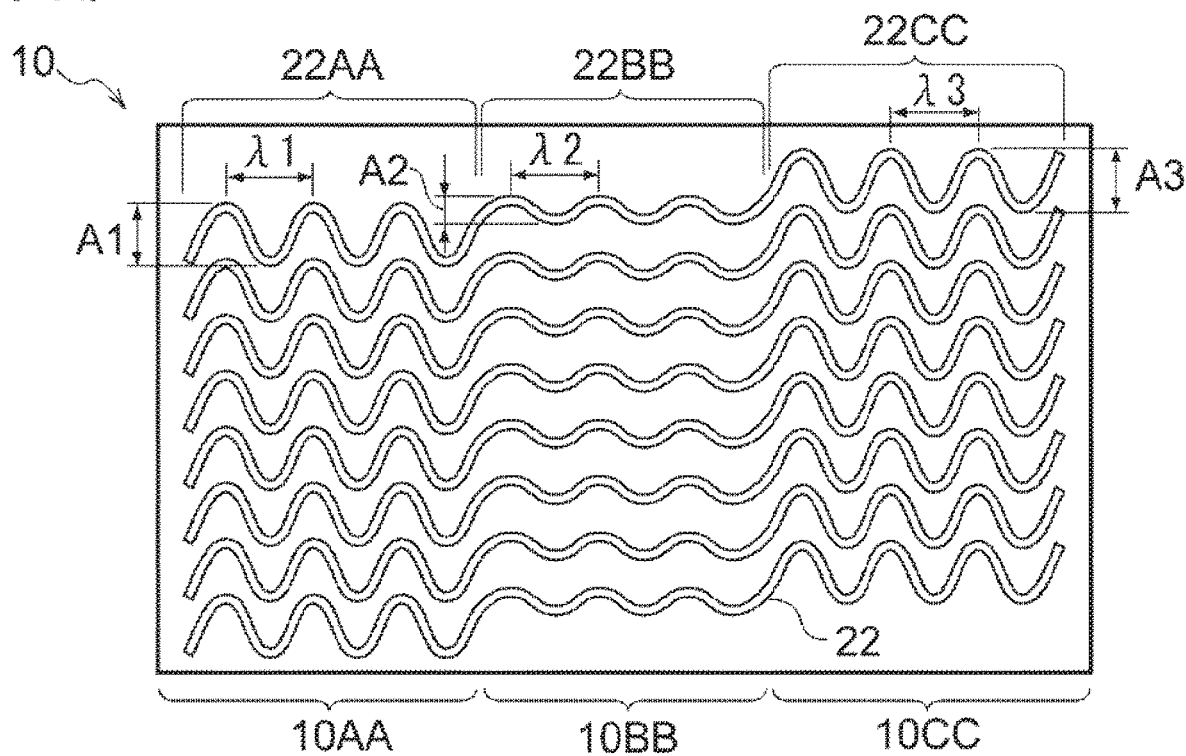
[FIG.4]
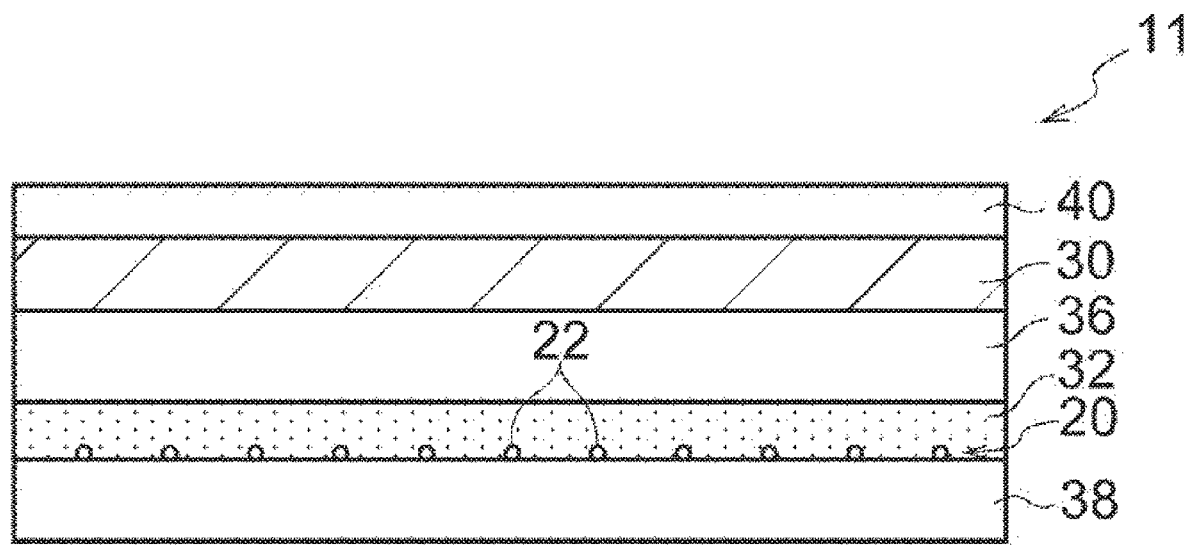

ELECTRICALLY CONDUCTIVE SHEET FOR USE IN THREE-DIMENSIONAL MOLDING

RELATED APPLICATIONS

This application is a National Phase of International Application No. PCT/JP2017/042678, filed on Nov. 28, 2017, which claims the benefit of Japanese Patent Application No. 2016-230553, filed on Nov. 28, 2016, the disclosures of which are incorporated in their entirety by reference herein.

TECHNICAL FIELD

The present disclosure relates to an electrically conductive sheet for use in three-dimensional molding.

BACKGROUND ART

Electrically conductive sheets are used in various kinds of applications, for example, as heat-generating sheets, such as heat-generating sheets for melting ice and snow, and heat-generating sheets for use in heaters.

For example, Patent Document 1 discloses "a transparent, flexible film heater including an electrically conductive metal portion in which fine metal wires are arranged". Further, Patent Document 1 also discloses that "the electrically conductive metal portion has a patterned structure in the form of parallel waves".

At the same time, techniques are known in which coating of a sheet for use in three-dimensional molding is performed while carrying out three-dimensional molding, utilizing a three-dimensional molding method, such as TOM (Three dimension Overlay Method) molding, film insert molding, or vacuum molding (vacuum forming). These techniques are used in order to impart functions such as decorative characteristics and scratch resistance to the surfaces of molded articles which are used in housings for home electrical appliances, interior parts for vehicles, interior materials for building materials, and the like (see Patent Document 4, for example).

Patent Document 1: Japanese Patent Application Laid-Open (JP-A) No. 2008-077879
Patent Document 2: JP-A 2015-182438

SUMMARY OF INVENTION

Technical Problem

Three-dimensional molding causes, when a sheet for use in three-dimensional molding is subjected thereto, an extension of the sheet. Accordingly, in the case of using, as a sheet for use in three-dimensional molding, an electrically conductive sheet including a pseudo-sheet structure in which electrically conductive linear bodies in the form of a straight line are arranged, the extension of the electrically conductive sheet is restricted by the electrically conductive linear bodies, in the direction in which the electrically conductive linear bodies extend, following the extension of the electrically conductive sheet. As a result, there are cases where an extension failure of the electrically conductive sheet or a breakage of the electrically conductive linear bodies may occur.

In contrast, when linear bodies formed in a wave pattern are used as the electrically conductive linear bodies, the electrically conductive linear bodies formed in a wave pattern can be easily extended by being straightened, in the direction in which the electrically conductive linear bodies extend, following the extension of the electrically conductive sheet. Thus, in the direction in which the electrically conductive linear bodies extend, the electrically conductive sheet can be easily extended without being restricted by electrically conductive linear bodies.

Further, in a case in which the three-dimensional molding causes a high degree of extension of the electrically conductive sheet, the use of linear bodies formed in a wave pattern having a short wavelength or a large amplitude as the electrically conductive linear bodies allows for increasing the length of the electrically conductive linear bodies formed in a wave pattern when straightened, and allows the electrically conductive linear bodies to easily follow the high degree of extension of the electrically conductive sheet.

However, in a case in which a molded article to be coated is a three-dimensional object having a complex shape, the degree of extension varies significantly depending on a region of the electrically conductive sheet, during the three-dimensional molding of the electrically conductive sheet. As a result, the degree of straightening of the electrically conductive linear bodies formed in a wave pattern also varies significantly depending on the region, possibly resulting in a decrease in function of the electrically conductive sheet after being subjected to the three-dimensional molding.

Accordingly, an object of the present disclosure is to provide an electrically conductive sheet for use in three-dimensional molding including a pseudo-sheet structure in which electrically conductive linear bodies formed in a wave pattern are arranged, wherein a decrease in the function of the sheet after being subjected to three-dimensional molding is prevented.

Solution to Problem

The above mentioned problems are solved by the following means.

<1>
An electrically conductive sheet for use in three-dimensional molding, the electrically conductive sheet including:
a pseudo-sheet structure in which a plurality of electrically conductive linear bodies extending unidirectionally are arranged spaced apart from each other, wherein each of the electrically conductive linear bodies includes:
a first portion formed in a wave pattern having a wavelength $\lambda 1$ and an amplitude $A1$; and
a second portion formed in a wave pattern having a wavelength $\lambda 2$ and an amplitude $A2$, at least one of which is different from the wavelength $\lambda 1$ or the amplitude $A1$ of the first portion; and
a resin protective layer provided at a side of one surface of the pseudo-sheet structure.
<2> The electrically conductive sheet for use in three-dimensional molding according to <1>, wherein each of the electrically conductive linear bodies is a linear body including a metal wire, or a linear body including an electrically conductive thread.
<3> The electrically conductive sheet for use in three-dimensional molding according to <1> or <2>, wherein each of the electrically conductive linear bodies is a linear body including a metal wire coated with a carbon material.
<4> The electrically conductive sheet for use in three-dimensional molding according to any one of <1> to <3>, wherein at least one layer, of layers provided at the side of the pseudo-sheet structure at which the resin protective layer is provided, contains a colorant.

<5> The electrically conductive sheet for use in three-dimensional molding according to any one of <1> to <4>, wherein at least one layer, of the layers provided at the side of the pseudo-sheet structure at which the resin protective layer is provided, contains a thermally conductive inorganic filler.

<6> The electrically conductive sheet for use in three-dimensional molding according to any one of <1> to <5>, further including a resin layer provided at an opposite side of the pseudo-sheet structure from the side at which the resin protective layer is provided.

<7> The electrically conductive sheet for use in three-dimensional molding according to any one of <1> to <6>, which is a heat-generating sheet for use in three-dimensional molding.

Advantageous Effects of Invention

The present disclosure provides an electrically conductive sheet for use in three-dimensional molding including a pseudo-sheet structure in which electrically conductive linear bodies formed in a wave pattern are arranged, wherein a decrease in the function of the sheet after being subjected to three-dimensional molding is prevented.

BRIEF DESCRIPTION OF DRAWINGS

FIG. 1 is a schematic plan view illustrating an electrically conductive sheet for use in three-dimensional molding according to a present embodiment.

FIG. 2 is a schematic sectional view illustrating the electrically conductive sheet for use in three-dimensional molding according to the present embodiment.

FIG. 3 is a schematic sectional view illustrating another example of the electrically conductive sheet for use in three-dimensional molding according to the present embodiment.

FIG. 4 is a schematic sectional view illustrating a first modified example of the electrically conductive sheet for use in three-dimensional molding according to the present embodiment.

DESCRIPTION OF EMBODIMENTS

An embodiment as one example of the present disclosure will be described below in detail. In the present specification, any numerical range indicated using an expression "from * to" represents a range in which numerical values described before and after the "to" are included in the range as the minimum value and the maximum value thereof, respectively.

<Electrically Conductive Sheet for Use in Three-Dimensional Molding>

The electrically conductive sheet for use in three-dimensional molding according to the present embodiment (hereinafter, also referred to as "electrically conductive sheet") includes: a pseudo-sheet structure in which a plurality of electrically conductive linear bodies extending unidirectionally are arranged spaced apart from each other, wherein each of the electrically conductive linear bodies includes: a first portion formed in a wave pattern having a wavelength $\lambda 1$ and an amplitude A1; and a second portion formed in a wave pattern having a wavelength $\lambda 2$ and an amplitude A2, at least one of which is different from the wavelength $\lambda 1$ or the amplitude A1 of the first portion; and a resin protective layer provided at the side of one surface of the pseudo-sheet structure. The term "amplitude" as used herein refers to a total (peak to peak) amplitude. Further, the term "surface" as used above refers, when a two-dimensional structure composed of a plurality of electrically conductive linear bodies is considered as a sheet, to a face which corresponds to a surface of the sheet.

In a case in which the three-dimensional molding causes a high degree of extension of a sheet 10, the use of linear bodies formed in a wave pattern having a short wavelength or a large amplitude as electrically conductive linear bodies 22 allows for increasing the length of the electrically conductive linear bodies 22 formed in a wave pattern when straightened, and allows the electrically conductive linear bodies 22 to easily follow the high degree of extension of the sheet 10.

However, in a case in which a molded article to be coated is a three-dimensional object having a complex shape, the degree of extension varies significantly depending on the region of the sheet 10, during the three-dimensional molding of the sheet 10. As a result, the degree of straightening of the electrically conductive linear bodies 22 formed in a wave pattern also varies significantly depending on the region. In other words, after the three-dimensional molding, some portions of the electrically conductive linear bodies 22 are well straightened to be straight or roughly straight, and some portions thereof are not well straightened and maintaining the wave pattern.

When the sheet 10 includes a pseudo-sheet structure 20 in which the electrically conductive linear bodies 22 including portions thereof which are roughly straight and portions thereof which are not straightened and maintaining the wave pattern, as described above, are arranged, the function of the sheet is decreased. For example, a consumption of power may be increased due to increased resistance of the pseudo-sheet structure 20, resulting primarily from the presence of the portions of the electrically conductive linear bodies 22 which are not straightened and maintaining the wave pattern. Alternatively, when used as a heat-generating sheet, for example, the amount of generated heat may be partially increased in the sheet, due to the presence of a region in which an abundance ratio per unit area of the electrically conductive linear bodies 22 is high.

In the electrically conductive sheet according to the present embodiment, each of the electrically conductive linear bodies is configured to include: the first portion formed in a wave pattern having the wavelength $\lambda 1$ and the amplitude A1; and the second portion formed in a wave pattern having the wavelength $\lambda 2$ and the amplitude A2, at least one of which is different from the wavelength $\lambda 1$ or the amplitude A1 of the first portion.

Specifically, the following configuration may be employed, depending on the shape of a molded article to be coated by the three-dimensional molding. For example, the portion of each of the electrically conductive linear bodies present in a region of the electrically conductive sheet with a high degree of extension during the three-dimensional molding is configured as the first portion formed in a wave pattern having a short wavelength and/or a large amplitude. At the same time, the portion of each of the electrically conductive linear bodies present in a region of the electrically conductive sheet with a low degree of extension during three-dimensional molding is configured as the second portion formed in a wave pattern having a long wavelength and/or a small amplitude.

In the case of using the electrically conductive linear bodies each including the first portion and the second portion, wherein the second portion has a wavelength and an amplitude, at least one of which is different from the wavelength or the amplitude of the first portion, as described above, the degree of straightening of the linear bodies in the respective regions of the sheet will consequently be uniform. This is because, the first portion of each of the electrically conductive linear bodies is straightened in a high degree in the region of the electrically conductive sheet with a high degree of extension, and the second portion of each of the electrically conductive linear bodies is straightened in a low degree in the region of the electrically conductive sheet with a low degree of extension, during the three-dimensional molding.

Accordingly, in the electrically conductive sheet according to the present embodiment, it is possible to prevent a decrease in the function of the sheet, such as an increased consumption of power due to increased resistance of the pseudo-sheet structure 20, or a partial increase in the amount of generated heat in the sheet, when used as a heat-generating sheet, for example, due to the presence of a region in which the abundance ratio per unit area of the electrically conductive linear bodies 22 is high.

A description will be given below regarding one example of the configuration of the electrically conductive sheet for use in three-dimensional molding according to the present embodiment, with reference to the drawings.

As shown in FIG. 1 and FIG. 2, an electrically conductive sheet 10 for use in three-dimensional molding according to the present embodiment (hereinafter, also simply referred to as "sheet 10"), includes, for example: the pseudo-sheet structure 20; a resin protective layer 30 provided at the side of one surface of the pseudo-sheet structure 20; an adhesive layer 32 provided between the pseudo-sheet structure 20 and the resin protective layer 30; and a release layer 34 provided at the opposite side of the pseudo-sheet structure 20 from the side at which the adhesive layer 32 is provided. In other words, the sheet 10 is composed, for example, of the release layer 34, the pseudo-sheet structure 20, the adhesive layer 32, and the resin protective layer 30, which are layered in this order.

The sheet 10 having the above described layer configuration will be subjected to three-dimensional molding, after peeling off the release layer 34 therefrom, with the face of the sheet on the side having the pseudo-sheet structure 20 facing a molded article (an adherend). At this time, the sheet 10 covers the surface of the molded article, in a state in which the sheet 10 is adhered to the surface of the molded article by an adhesive force of the adhesive layer 32 exposed from between the "the plurality of linear bodies" constituting the pseudo-sheet structure 20. The sheet 10 having the above described layer configuration is suitably used in TOM molding or vacuum molding (vacuum forming), among three-dimensional molding methods.

Since the sheet 10 has the above described layer configuration in which the adhesive layer 32 is provided between the pseudo-sheet structure 20 and the resin protective layer 30, the resin protective layer 30 of the pseudo-sheet structure 20 (namely, the electrically conductive linear bodies 22) can be fixed easily. Further, it is possible to simplify the production process in the production of the sheet 10, since the formation of the pseudo-sheet structure 20 can be performed while immediately fixing the electrically conductive linear bodies 22 on the surface of the adhesive layer 32.

In the sheet 10, each of the electrically conductive linear bodies 22 includes a first portion 22A formed in a wave pattern, a second portion 22B formed in a wave pattern, and a third portion 22C formed in a wave pattern.

The first portion 22A has the wavelength $\lambda 1$ and the amplitude A1.

The second portion 22B has the wavelength $\lambda 2$ which is shorter than the wavelength $\lambda 1$, and the amplitude A2 which is the same as the amplitude A1.

The third portion 22C has a wavelength $\lambda 3$ which is the same as the wavelength $\lambda 1$, and an amplitude A3 which is the same as the amplitude A1 and amplitude A2.

In other words, the second portion 22B of each of the electrically conductive linear bodies 22 has a longer length to be straightened as compared to those of the first portion 22A and the third portion 22C, in the direction in which the electrically conductive linear bodies 22 extend.

The third portion 22C of each of the electrically conductive linear bodies 22, on the other hand, extends in the same degree as the first portion 22A does, in the direction in which the electrically conductive linear bodies 22 extend.

The region of the sheet 10 including the second portions 22B is defined as a region with a higher degree of extension as compared to the regions of the sheet 13 including the first portions 22A and the third portions 22C, respectively, during the three-dimensional molding.

When the sheet 10 including the pseudo-sheet structure 20 in which the electrically conductive linear bodies 22 each including the above described first portion 22A to third portion 22C formed in a wave pattern are arranged, is subjected to three-dimensional molding to be coated on the surface of a molded article, the respective portions of the electrically conductive linear bodies 22 are straightened in varying degrees, depending on the degree of extension of the sheet 10. As a result, it is possible to adjust every portion of the electrically conductive linear bodies 22 to be in a roughly straight shape, after the three-dimensional molding.

Accordingly, in the sheet 10 including the first portions 22A to the third portions 22C formed in a wave pattern, a decrease in the function of the sheet can be prevented.

In FIG. 1, a reference numeral 10A denotes the region of the sheet 10 including the first portions 22A, a reference numeral 10B denotes the region of the sheet 10 including the second portions 22B, and a reference numeral 10C denotes the region of the sheet 10 including the third portions 22C.

The electrically conductive linear bodies 22 in the sheet 10 are not limited to the above described embodiment. For example, each of the electrically conductive linear bodies 22 may have a first portion 22AA, a second portion 22BB, and a third portion 22CC, varying in amplitude, as shown in FIG. 3.

In this embodiment (see FIG. 3), the first portion 22AA has a wavelength $\lambda 1$ and an amplitude A2.

The second portion 22BB has a wavelength $\lambda 2$ which is the same as the wavelength $\lambda 1$, and an amplitude A2 which is smaller than the amplitude A1.

The third portion 22CC has a wavelength $\lambda 3$ which is the same as the wavelength $\lambda 1$ and the wavelength $\lambda 2$, and an amplitude A3 which is the same as the amplitude A1.

In other words, the second portion 22BB of each of the electrically conductive linear bodies 22 has a shorter length to be straightened as compared to those of the first portion 22AA and the third portion 22CC, in the direction in which the electrically conductive linear bodies 22 extend.

The third portion 22CC of each of the electrically conductive linear bodies 22, on the other hand, extends in the same degree as the first portion 22AA does, in the direction in which the electrically conductive linear bodies 22 extend.

The region of the sheet 10 including the second portions 22BB is defined as a region with a lower degree of extension as compared to the regions of the sheet 13 including the first portions 22AA and the third portions 22CC, respectively, during the three-dimensional molding.

When the sheet 10 including the pseudo-sheet structure 20 in which the electrically conductive linear bodies 22 each including the above described first portion 22AA to third portion 22CC formed in a wave pattern are arranged, is subjected to three-dimensional molding to be coated on the surface of a molded article, the respective portions of the electrically conductive linear bodies 22 are straightened in varying degrees, depending on the degree of extension of the sheet 10. As a result, it is possible to adjust every portion of the electrically conductive linear bodies 22 to be in a roughly straight shape, after the three-dimensional molding.

Accordingly, a decrease in the function of the sheet can be prevented, also in the sheet 10 including the first portions 22AA to the third portions 22CC formed in a wave pattern.

In FIG. 3, a reference numeral 10AA denotes the region of the sheet 10 including the first portions 22AA, a reference numeral 10BB denotes the region of the sheet 10 including the second portions 22BB, and a reference numeral 10CC denotes the region of the sheet 10 including the third portions 22CC.

Although not shown in the Figures, the electrically conductive linear bodies 22 in the sheet 10 may have a first portion, a second portion, and a third portion varying both in wavelength and amplitude.

The electrically conductive linear bodies 22 are not limited to the above mentioned embodiments, as long as each of the linear bodies 22 includes: the first portion formed in a wave pattern having the wavelength $\lambda 1$ and the amplitude A1; and the second portion formed in a wave pattern having the wavelength $\lambda 2$ and the amplitude A2, at least one of which is different from the wavelength $\lambda 1$ or the amplitude A1 of the first portion.

The varying degrees of the wavelength and the amplitude in the respective portions of the electrically conductive linear bodies 22 are adjusted depending on the shape of a molded article. Further, each of the electrically conductive linear bodies may include a straight portion. The wavelength and the amplitude in the respective portions may be varied stepwise, or gradually.

Each of the configurations of the sheet 10 will now be described in detail.

(Pseudo-Sheet Structure)

The pseudo-sheet structure 20 is composed of a pseudo-sheet structure in which a plurality of the electrically conductive linear bodies 22 extending unidirectionally are arranged spaced apart from each other. Each of the electrically conductive linear bodies 22 is curved or bent periodically or randomly. Specifically, each of the electrically conductive linear bodies 22 is formed, for example, in a wave pattern, such as a sine wave, a rectangular wave, a chopping wave, a saw tooth wave, or the like. In other words, the pseudo-sheet structure 20 is configured to have a structure, for example, in which a plurality of the electrically conductive linear bodies 22 which are formed in a wave pattern and extending unidirectionally are arranged at regular intervals in the direction perpendicular to the direction in which the electrically conductive linear bodies 22 extend. The plurality of the electrically conductive linear bodies 22 are preferably arranged at regular intervals, but may be arranged at irregular intervals.

In a case in which the electrically conductive linear bodies 22 in the pseudo-sheet structure 20 are arranged such that adjacent electrically conductive linear bodies 22 are regularly spaced apart from each other, an interval L between adjacent electrically conductive linear bodies 22 is preferably from 0.3 mm to 12.0 mm, and more preferably from 0.5 mm to 10.0 mm, and still more preferably from 0.8 mm to 7.0 mm.

When the interval L between adjacent electrically conductive linear bodies 22 is adjusted within the range of from 0.3 mm to 12.0 mm, in a case in which the sheet 10 includes the adhesive layer 32, it is possible to secure an exposed surface area of the adhesive layer 32 exposed from between the electrically conductive linear bodies 22, and to prevent the adhesion provided by the adhesive layer 32 exposed from the pseudo-sheet structure 20, from being disturbed by the electrically conductive linear bodies 22. Further, when the interval between adjacent electrically conductive linear bodies 22 is within the above mentioned range, the electrically conductive linear bodies 22 are arranged in a relatively dense state. Therefore, improvements in the function of the sheet can be achieved, such as, for example, maintaining the resistance of the pseudo-sheet structure 20 low, allowing a uniform distribution of temperature rise, and the like.

The interval L between adjacent electrically conductive linear bodies 22 is obtained by observing the electrically conductive linear bodies 22 in the pseudo-sheet structure 20 using a digital microscope (device name: VHX-5000 (manufactured by KEYENCE CORPORATION)), and by measuring the interval between two adjacent electrically conductive linear bodies 22.

Note that, the interval L between two adjacent electrically conductive linear bodies 22 refers to a length along the direction in which the electrically conductive linear bodies 22 are arranged, and a length between the opposed portions of the two electrically conductive linear bodies 22 (see FIG. 2). In a case in which the electrically conductive linear bodies 22 are arranged at irregular intervals, the interval L is the mean value of the intervals between every two adjacent electrically conductive linear bodies 22. It is preferable that the electrically conductive linear bodies 22 are arranged at roughly regular intervals in the pseudo-sheet structure 20, in terms of facilitating the control of the value of the interval L, and securing uniformity in functions such as light transmittance and heat-generating performance.

The electrically conductive linear bodies 22 preferably have a diameter D of from 5 µm to 75 µm, and more preferably from 8 µm to 60 µm, and still more preferably from 12 µm to 40 µm. When the diameter D of the electrically conductive linear bodies 22 is from 5 µm to 75 µm, an increase in sheet resistance of the pseudo-sheet structure 20 can be reduced. Further, when the diameter D is within the above range, it is possible to avoid bulging of the surface of the resin protective layer 30 at portions beneath which the electrically conductive linear bodies 22 are present, without excessively increasing the thickness of the resin protective layer 30. This applies even when the electrically conductive linear bodies 22 are embedded in a layer(s) (such as the adhesive layer 32, the resin protective layer, etc.) adjacent to the side of the resin protective layer 30, after the sheet 10 has been subjected to three-dimensional molding to be coated on the surface of a molded article. In addition, the straightening of the electrically conductive linear bodies 22 formed in a wave pattern, which occurs when the sheet 10 is subjected to three-dimensional molding, is less likely to be interfered with by an adjacent layer (such as the adhesive layer 32). In particular, when the diameter D of the electrically conductive linear bodies 22 is 12 µm or more, the sheet resistance of the pseudo-sheet structure 20 is more easily reduced. In a case in which a heat-generating sheet for use in three-dimensional molding is used as the sheet 10 to be coated on the surface of a molded article, and when the coated surface is touched by a hand, there is a tendency that bulging of the resin protective layer 30 due to the underlying electrically conductive linear bodies 22 is more likely to be perceived. However, according to this heat-generating sheet for use in three-dimensional molding, the bulging of the resin protective layer 30 can be easily prevented.

The diameter D of the electrically conductive linear bodies 22 is obtained by: observing the electrically conductive linear bodies 22 in the pseudo-sheet structure 20 using a digital microscope; measuring the diameter of the electrically conductive linear bodies 22 at randomly selected 5 points; and calculating the mean value of the measured diameters, to be taken as the diameter D.

The electrically conductive linear bodies 22 preferably have a volume resistivity R of from $1.0 \times 10^{-9}$ Ωcm to $1.0 \times 10^{-3}$ Ωcm, and more preferably from $1.0 \times 10^{-8}$ Ωcm to $1.0 \times 10^{-4}$ Ωcm. When the volume resistivity R of the electrically conductive linear bodies 22 is within the above range, a surface resistance of the pseudo-sheet structure 20 is more easily reduced.

The measurement of the volume resistivity R of the electrically conductive linear bodies 22 is carried out as follows. First, the diameter D of the electrically conductive linear bodies 22 is obtained according to the method describe above. Next, a silver paste is applied on both ends of one of the electrically conductive linear bodies 22 and the resistance at a portion corresponding to a length of 40 mm is measured, thereby obtaining a resistance value of the electrically conductive linear body 22. Then, a cross-sectional area of the electrically conductive linear body 22 is calculated, assuming that the electrically conductive linear body 22 is in the form of a column having the diameter D. The thus calculated value of the cross-sectional area is multiplied by the value of the above measured length, and the obtained value is taken as the volume of the electrically conductive linear body 22. The resistance value obtained above is divided by this value of volume, thereby calculating the volume resistivity R of the electrically conductive linear body 22.

The electrically conductive linear bodies 22 are not particularly limited as long as the electrically conductive linear bodies are electrically conductive. Each of the electrically conductive linear bodies 22 may be, for example, a linear body including a metal wire, or a linear body including an electrically conductive thread. The electrically conductive linear body 22 may also be a linear body including a metal wire and an electrically conductive thread (such as a linear body obtained by twisting a metal wire and an electrically conductive thread).

Since the electrically conductive linear bodies 22 are formed in a wave pattern, in a case in which the electrically conductive linear bodies 22 are straightened and extended following the extension of the sheet 10 when the sheet 10 is extended by being subjected to three-dimensional molding, a strong adhesion between the electrically conductive linear bodies 22 and the adhesive layer 32 interferes with the extension of the electrically conductive linear bodies 22.

When a linear body including a metal wire or a linear body including an electrically conductive thread is used as the electrically conductive linear bodies 22, at this time, the electrically conductive linear bodies 22 will be in a state moderately adhered to the adhesive layer 32. Thus, even when the electrically conductive linear bodies 22 formed in a wave pattern are straightened and extended following the extension of the sheet 10 due to three-dimensional molding, it is possible to facilitate the peeling of the electrically conductive linear bodies 22 from the adhesive layer 32, thereby facilitating the extension of the electrically conductive linear bodies 22.

Since a linear body including a metal wire and a linear body including an electrically conductive thread both have a high thermal conductivity and a high electrical conductivity, the use thereof as the electrically conductive linear bodies 22 facilitates an improvement in the light transmittance, while reducing the surface resistance, of the pseudo-sheet structure 20. Further, a rapid generation of heat is more likely to be achieved. In addition, linear bodies having a small diameter are more easily obtained, as described above.

The linear body including a metal wire may be a linear body composed of a single metal wire, or a linear body obtained by twisting a plurality of metal wires.

Examples of the metal wire include: a wire containing a metal such as copper, aluminum, tungsten, iron, molybdenum, nickel, titanium, silver, or gold; and a wire containing an alloy (for example, a steel such as stainless steel or carbon steel, brass, phosphor bronze, zirconium-copper alloy, beryllium copper, iron-nickel, nichrome, nickel-titanium, Kanthal, Hastelloy, or rhenium-tungsten) containing two or more kinds of metals. Further, the metal wire may be a metal wire plated with tin, zinc, silver, nickel, chromium, a nickel-chromium alloy, or a solder. Alternatively, the metal wire may be a metal wire whose surface is coated with a carbon material or a polymer to be described later.

The metal wire may be, for example, a metal wire coated with a carbon material. When the metal wire is coated with a carbon material, the adhesion between the metal wire and the adhesive layer 32 is reduced. Therefore, by using a linear body including a metal wire coated with a carbon material as the electrically conductive linear bodies 22, it is possible to facilitate the peeling of the electrically conductive linear bodies 22 from the adhesive layer 32, thereby facilitating the extension of the electrically conductive linear bodies 22, even in a case in which the electrically conductive linear bodies 22 formed in a wave pattern are straightened and extended following the extension of the sheet 10 due to three-dimensional molding. Further, when the metal wire is coated with a carbon material, a corrosion of the metal can also be inhibited.

Examples of the carbon material for coating the metal wire include: amorphous carbons such as carbon blacks, activated carbons, hard carbons, soft carbons, mesoporous carbons, and carbon fibers; graphites; fullerenes; graphenes; and carbon nanotubes.

On the other hand, the linear body including an electrically conductive thread may be a linear body composed of a single electrically conductive thread, or may be a linear body obtained by twisting a plurality of electrically conductive threads.

Examples of the electrically conductive thread include a thread containing an electrically conductive fiber (such as a metal fiber, a carbon fiber, or a fiber of an ion-conductive polymer); a thread on the surface of which a metal (such as copper, silver, or nickel) is plated or vapor-deposited; and a thread impregnated with a metal oxide. Particularly preferred examples of the linear body including an electrically conductive thread include a linear body including a thread formed using a carbon nanotube (hereinafter, also referred to as "carbon nanotube linear body").

The carbon nanotube linear body can be obtained, for example, by drawing carbon nanotubes in the form of sheets, from the end portion of a carbon nanotube forest (which refers to a grown form of carbon nanotubes obtained by allowing a plurality of carbon nanotubes to grow on a substrate in an orientation vertical to the substrate; sometimes also referred to as "array"), and the thus drawn carbon nanotube sheets are formed into bundles, followed by twisting the bundles of the carbon nanotube sheets. In a case in which the bundles of the carbon nanotube sheets are not twisted in a twisting step, in the production method as described above, a carbon nanotube linear body in the form of a ribbon is obtained. In a case in which the bundles are twisted, on the other hand, a linear body in the form of a thread is obtained. The carbon nanotube linear body in the form of a ribbon does not have a structure in which carbon nanotubes are twisted. In addition to the above described method, a carbon nanotube linear body can also be obtained by spinning a thread from a dispersion liquid of carbon nanotube. Production of a carbon nanotube linear body by spinning can be carried out, for example, by a method disclosed in US Patent publication No. 2013/0251619 (JP-A No. 2011-253140). It is preferable to use a carbon nanotube linear body in the form of a thread, in terms of obtaining uniformity in the diameter of carbon nanotube linear bodies. In terms of obtaining a carbon nanotube linear body having a high purity, it is preferable to obtain a carbon nanotube linear body in the form of a thread, by twisting the carbon nanotube sheets. The carbon nanotube linear body may be a linear body obtained by weaving two or more carbon nanotube linear bodies.

The carbon nanotube linear body may also be a linear body including a carbon nanotube and a metal (hereinafter, also referred to as "composite linear body"). The use of the composite linear body facilitates an improvement in the electric conductivity, while maintaining the above mentioned characteristics of the carbon nanotube linear body. In other words, the resistance of the pseudo-sheet structure 20 can be easily reduced.

Examples of the composite linear body include: (1) a composite linear body which is obtained by drawing carbon nanotubes in the form of sheets from the end portion of a carbon nanotube forest, and then forming the thus drawn carbon nanotube sheets into bundles, followed by twisting the bundles of the carbon nanotube sheets, wherein, in the above mentioned process of obtaining a carbon nanotube linear body, a single metal or a metal alloy is supported on the surface of the forest, sheets or bundles, or of the twisted linear body, by vapor-deposition, ion plating, sputtering, wet plating or the like; (2) a composite linear body obtained by twisting bundles of the carbon nanotube sheets, along with a linear body composed of a single metal or a linear body composed of a metal alloy, or a composite linear body; and (3) a composite linear body obtained by weaving a linear body composed of a single metal or a linear body composed of a metal alloy, or a composite linear body, with a carbon nanotube linear body or a composite linear body. When twisting the bundles of the carbon nanotube sheets for obtaining the composite linear body described in (2), a metal may be supported on the carbon nanotube, in the same manner as the composite linear body described in (1). Further, the composite linear body described in (3) is a linear body obtained by weaving two linear bodies. However, the composite linear body may be one obtained by weaving three or more of carbon nanotube linear bodies, or linear bodies composed of a single metal or linear bodies composed of a metal alloy or composite linear bodies, as long as at least one of a linear body composed of a single metal or a linear body composed of a metal alloy, or a composite linear body is included.

Examples of the metal contained in the composite linear body include single metals such as gold, silver, copper, iron, aluminum, nickel, chromium, tin, and zinc; and alloys (such as a copper-nickel-phosphorus alloy, and a copper-iron-phosphorus-zinc alloy) containing at least one of the single metals.

(Resin Protective Layer)

The resin protective layer 30 is a layer which constitutes the surface of the sheet 10 when the sheet 10 has been subjected to three-dimensional molding to be coated on a molded article. In other words, the resin protective layer 30 is a layer for protecting the pseudo-sheet structure 20, and functional layers (such as a thermally conductive layer, a coloring layer, and/or a decorative layer) provided between the resin protective layer 30 and the pseudo-sheet structure 20, and for increasing the strength of the surface, and maintaining the functions and the like, of the sheet 10.

The resin protective layer 30 preferably contains a thermoplastic resin, in terms of three-dimensional moldability.

Examples of the thermoplastic resin include known resins such as polyolefin resins, polyester resins, polyacrylic resins, polystyrene resins, polyimide resins, polyimideamide resins, polyamide resins, polyurethane resins, polycarbonate resins, polyarylate resins, melamine resins, epoxy resins, urethane resins, silicone resins, and fluorine resins; and mixed resins containing two or more kinds of the above mentioned resins.

It is also preferable that the resin protective layer 30 contains a thermosetting resin, in terms of surface protection.

Examples of the thermosetting resin include known compositions such as epoxy resin compositions, resin compositions curable by a urethane reaction, and resin compositions curable by a radical polymerization reaction.

Examples of the epoxy resin composition include a combination of an epoxy resin such as a multifunctional type epoxy resin, a bisphenol A type epoxy resin, a bisphenol F type epoxy resin, a biphenyl type epoxy resin, or a dicyclopentadiene type epoxy resin, with a curing agent such as an amine compound or a phenolic curing agent.

Examples of the resin composition curable by a urethane reaction include a resin composition containing a (meth) acrylic polyol and a polyisocyanate compound.

Examples of the resin composition curable by a radical polymerization reaction include a radical polymerizable resin composition such as a (meth)acryloyl group or an unsaturated polyester. Examples thereof include a (meth) acrylic resin containing a radical polymerizable group in its side chain (such as a (meth)acrylic resin obtained by reacting a polymer of a vinyl monomer (such as hydroxy (meth) acrylate, or glycidyl (meth)acrylate) containing a reactive group, with a monomer (such as a (meth)acrylic acid, or an isocyanato group-containing (meth)acrylate) containing a group capable of reacting with the reactive group of the copolymer, and containing a radical polymerizable group); an epoxy acrylate containing a (meth)acrylic group obtained by allowing a (meth)acrylic acid or the like to react with a terminal of an epoxy resin; and
an unsaturated polyester obtained by condensation of a carboxylic acid (such as fumaric acid) containing an unsaturated group with a diol.

The resin protective layer 30 may contain a thermally conductive inorganic filler. In a case in which the resin protective layer 30 contains a thermally conductive inorganic filler, it is possible to effectively prevent the occurrence of uneven temperature rise (unevenness in the distribution of temperature rise) at the surface of the sheet, when the sheet 10 is used as a heat-generating sheet for use in three-dimensional molding.

The thermally conductive inorganic filler is not particularly limited, as long as the inorganic filler has a thermal conductivity of 10 W/mK or more. Examples thereof include metal particles, metal oxide particles, metal hydroxide particles, and metal nitride particles. Specific examples of the thermally conductive inorganic filler include known inorganic particles such as silver particles, copper particles, aluminum particles, nickel particles, zinc oxide particles, aluminum oxide particles, aluminum nitride particles, silicon oxide particles, magnesium oxide particles, aluminum nitride particles, titanium particles, boron nitride particles, silicon nitride particles, silicon carbide particles, diamond particles, graphite particles, carbon nanotube particles, metal silicon particles, carbon fiber particles, fullerene particles and glass particles.

The thermally conductive inorganic filler may be used singly, or in combination of two or more kinds.

The resin protective layer 30 preferably has a content of the thermally conductive inorganic filler of from 0% by mass to 90% by mass, more preferably from 2% by mass to 70% by mass, and still more preferably from 5% by mass to 50% by mass, with respect to the total amount of the resin protective layer.

The resin protective layer 30 may contain a colorant. In a case in which a colorant is incorporated into the resin protective layer 30 so that the resin protective layer 30 serves as a coloring layer, the resulting sheet has an increased ability to conceal the electrically conductive linear bodies 22.

The colorant is not particularly limited, and a known colorant such as an inorganic pigment, an organic pigment, or a dye can be used, depending on the objective.

The resin protective layer 30 may contain other additives. Examples of the other additives include curing agents, anti-aging agents, photostabilizers, flame retardants, electrically conductive agents, antistatic agents, and plasticizers.

The surface of the resin protective layer 30 on the side of the pseudo-sheet structure 20 may be provided with an image(s) (such as a drawing, a letter, a pattern, and/or a design) formed with an image forming material (such as an ink or a toner). The image can be formed by a known printing method such as gravure printing, offset printing, screen printing, ink-jet printing, or heat transfer printing. In this case, the resin protective layer 30 serves both as a decorative layer, and as a layer having a function to protect the decoration provided by the image. Further, in this case, the sheet 10 can be used as a sheet for use in three-dimensional decoration.

The resin protective layer 30 preferably has a thickness of, for example, from 8 µm to 2,500 µm, more preferably from 10 µm to 2,300 µm, and still more preferably from 15 µm to 2,000 µm, in terms of three-dimensional moldability, and securing the protective function of the resin protective layer 30.

(Adhesive Layer)

The adhesive layer 32 is a layer containing an adhesive. When the sheet 10 has a configuration in which the adhesive layer 32 is interposed between the resin protective layer 30 and the pseudo-sheet structure 20, with the adhesive layer 32 being in contact with the pseudo-sheet structure 20, the adhesive layer 32 allows the sheet 10 to be easily coated on the surface of a molded article. Specifically, in the sheet 10, the adhesive layer 32 exposed from the pseudo-sheet structure 20 (namely, from between the plurality of the electrically conductive linear bodies 22 included therein) facilitates the adhesion between the sheet 10 and the surface of the molded article, as described above.

The adhesive layer 32 may be curable. When the adhesive layer is cured, a hardness sufficient for protecting the pseudo-sheet structure 20 is imparted to the adhesive layer 32. Further, the adhesive layer 32 which has been cured has an improved impact resistance, as a result of which the deformation of the cured adhesive layer 32 due to impact can also be reduced.

The adhesive layer 32 is preferably curable by an energy ray such as UV light, a visible energy ray, an infrared ray, or an electron beam, since it allows the adhesive layer 32 to be cured easily in a short period of time. Note that the expression "curing by an energy ray" includes heat curing carried out by heating using an energy ray.

Conditions for carrying out curing by an energy ray vary depending on the energy ray to be used. However, in the case of carrying out curing out by UV light irradiation, for example, UV light is preferably irradiated at a dose of from 10 $mJ/cm^2$ to 3,000 $mJ/cm^2$, and for a period of time from 1 second to 180 seconds.

The adhesive to be used in the adhesive layer 32 may be, for example, a so-called heat seal type adhesive which exhibits adhesiveness when heated, or an adhesive which exhibits tackiness when humidified. However, the adhesive layer 32 is preferably a pressure sensitive adhesive layer formed from a pressure sensitive adhesive, in terms of ease of use. The pressure sensitive adhesive to be used in the pressure sensitive adhesive layer is not particularly limited. Examples of the pressure sensitive adhesive include acrylic pressure sensitive adhesives, urethane pressure sensitive adhesives, rubber pressure sensitive adhesives, polyester pressure sensitive adhesives, silicone pressure sensitive adhesives, and polyvinyl ether pressure sensitive adhesives. Of these, the pressure sensitive adhesive is preferably at least any one selected from the group consisting of acrylic pressure sensitive adhesives, urethane pressure sensitive adhesives, and rubber pressure sensitive adhesives. The pressure sensitive adhesive is more preferably an acrylic pressure sensitive adhesive.

Examples of the acrylic pressure sensitive adhesive include: a polymer containing a structural unit derived from an alkyl (meth)acrylate containing a straight chain alkyl group or a branched alkyl group (namely, a polymer obtained by at least polymerizing an alkyl (meth)acrylate); and an acrylic polymer containing a structural unit derived from a (meth)acrylate containing a ring structure (namely, a polymer obtained by at least polymerizing a (meth)acrylate containing a ring structure). The "(meth)acrylate" is used herein as a term which refers to both "acrylate" and "methacrylate", and the same applies for other terms similar thereto.

In a case in which the acrylic polymer is a copolymer, the form of copolymerization thereof is not particularly limited. The acrylic copolymer may be any of a block copolymer, a random copolymer, or a graft copolymer.

Among those mentioned above, the acrylic pressure sensitive adhesive is preferably an acrylic copolymer containing: a structural unit (a1) derived from an alkyl (meth) acrylate (a1') (hereinafter, also referred to as "monomer component (a1')") containing a chain alkyl group having from 1 to 20 carbon atoms; and a structural unit (a2) derived from a functional group-containing monomer (a2') (hereinafter, also referred to as "monomer component (a2')").

Note, however, that the acrylic copolymer may further contain a structural unit (a3) derived from another monomer component (a3') other than the monomer component (a1') and the monomer component (a2').

The number of carbon atoms in the chain alkyl group contained in the monomer component (a1') is preferably from 1 to 12, more preferably from 4 to 8, and still more preferably from 4 to 6, in terms of improving the adhesive property. Examples of the monomer component (a1') include methyl (meth)acrylate, ethyl (meth)acrylate, propyl (meth)acrylate, n-butyl (meth)acrylate, 2-ethylhexyl (meth)acrylate, lauryl (meth)acrylate, tridecyl (meth)acrylate, and stearyl (meth)acrylate. Among these monomer components (a1'), butyl (meth)acrylate and 2-ethylhexyl (meth)acrylate are preferred, and butyl (meth)acrylate is more preferred.

The content of the structural unit (a1) is preferably from 50% by mass to 99.5% by mass, more preferably from 55% by mass to 99% by mass, still more preferably from 60% by mass to 97% by mass, and further still more preferably from 65% by mass to 95% by mass, with respect to the total amount (100% by mass) of the structural units in the acrylic copolymer.

Examples of the monomer component (a2') include hydroxy group-containing monomers, carboxy group-containing monomers, epoxy group-containing monomers, amino group-containing monomers, cyano group-containing monomers, keto group-containing monomers, and alkoxysilyl group-containing monomers. Among these monomer components (a2'), a hydroxy group-containing monomer and a carboxy group-containing monomer are preferred.

Examples of the hydroxy group-containing monomer include 2-hydroxyethyl (meth)acrylate, 2-hydroxypropyl (meth)acrylate, 2-hydroxybutyl (meth)acrylate, 3-hydroxybutyl (meth)acrylate, and 4-hydroxybutyl (meth)acrylate. Of these, 2-hydroxyethyl (meth)acrylate is preferred.

Examples of the carboxy group-containing monomer include (meth)acrylic acid, maleic acid, fumaric acid, and itaconic acid. Of these, (meth)acrylic acid is preferred.

Examples of the epoxy group-containing monomer include glycidyl (meth)acrylate.

Examples of the amino group-containing monomer include diaminoethyl (meth)acrylate.

Examples of the cyano group-containing monomer include acrylonitrile.

The content of the structural unit (a2) is preferably from 0.1% by mass to 50% by mass, more preferably from 0.5% by mass to 40% by mass, still more preferably from 1.0% by mass to 30% by mass, and further still more preferably from 1.5% by mass to 20% by mass, with respect to the total amount (100% by mass) of the structural units in the acrylic copolymer.

Examples of the monomer component (a3') include: (meth)acrylates containing a ring structure such as cyclohexyl (meth)acrylate, benzyl (meth)acrylate, isobornyl (meth)acrylate, dicyclopentanyl (meth)acrylate, dicyclopentenyl (meth)acrylate, dicyclopentenyloxyethyl (meth)acrylate, imide (meth)acrylate, and acryloylmorpholine; vinyl acetates; and styrenes.

The content of the structural unit (a3) is preferably from 0% by mass to 40% by mass, more preferably from 0% by mass to 30% by mass, still more preferably from 0% by mass to 25% by mass, and further still more preferably from 0% by mass to 20% by mass, with respect to the total amount (100% by mass) of the structural units in the acrylic copolymer.

The monomer component (a1') may be used singly, or in combination of two or more kinds thereof; the monomer component (a2') may be used singly, or in combination of two or more kinds thereof; and the monomer component (a3') may be used singly, or in combination of two or more kinds thereof.

The acrylic copolymer may be crosslinked by a crosslinking agent. Examples of the crosslinking agent include epoxy crosslinking agents, isocyanate crosslinking agents, aziridine crosslinking agents, and metal chelate crosslinking agents, which are well known. In the case of crosslinking the acrylic copolymer, a functional group derived from the monomer component (a2') can be used as a crosslinking site for reaction with the crosslinking agent.

The pressure sensitive adhesive layer may contain an energy ray curable component, in addition to the pressure sensitive adhesive.

Examples of the energy ray curable component include, in a case in which the energy ray is UV light, compounds containing two or more UV light polymerizable functional groups within one molecule, such as: trimethylolpropane tri(meth)acrylate, ethoxylated isocyanuric acid tri(meth)acrylate, ditrimethylolpropane tetra(meth)acrylate, tetramethylolmethane tetra(meth)acrylate, pentaerythritol tri(meth)acrylate, dipentaerythritol monohydroxypenta(meth)acrylate, dipentaerythritol hexa(meth)acrylate, caprolactone modified dipentaerythritol hexa(meth)acrylate, 1,4-butylene glycol di(meth)acrylate, 1,6-hexanediol di(meth)acrylate, dicyclopentadiene dimethoxy di(meth)acrylate, polyethylene glycol di(meth)acrylate, oligoester (meth)acrylate, urethane (meth)acrylate oligomer, epoxy modified (meth)acrylate, and polyether (meth)acrylate.

The energy ray curable component may be used singly, or as a mixture of two or more kinds thereof.

In a case in which an acrylic pressure sensitive adhesive is used as the pressure sensitive adhesive, a compound containing a functional group which reacts with a functional group derived from the monomer component (a2') in the acrylic copolymer, and an energy ray polymerizable functional group, within one molecule, may be used as the energy ray curable component. Due to the reaction between the functional group in this compound and the functional group derived from the monomer component (a2') in the acrylic copolymer, side chains of the acrylic copolymer become polymerizable by the irradiation of an energy ray. In a case in which the pressure sensitive adhesive is one other than the acrylic pressure sensitive adhesive, a component having an energy ray polymerizable side chain may be used as a copolymer component other than the copolymer which serves as a pressure sensitive adhesive, as well.

In a case in which the pressure sensitive adhesive layer is energy ray curable, the pressure sensitive adhesive layer preferably contains a photopolymerization initiator. Incorporation of a photopolymerization initiator serves to accelerate the rate at which the pressure sensitive adhesive layer is cured by the irradiation of an energy ray. Examples of the photopolymerization initiator include benzophenone, acetophenone, benzoin, benzoin methyl ether, benzoin ethyl ether, benzoin isopropyl ether, benzoin isobutyl ether, benzoin benzoic acid, benzoin methyl benzoate, benzoin dimethyl ketal, 2,4-diethylthioxanthone, 1-hydroxycyclohexyl phenyl ketone, benzyl diphenyl sulfide, tetramethylthiuram monosulfide, azobisisobutyronitrile, benzyl, dibenzyl, diacetyl, 2-chloroanthraquinone, 2,4,6-trimethylbenzoyl diphenylphosphine oxide, 2-benzothiazole-N,N-diethyldithiocarbamate, and oligo {2-hydroxy-2-methyl-1-[4-(1-propenyl)phenyl]propanone}.

The adhesive layer 32 may contain an inorganic filler. Incorporation of an inorganic filler serves to further improve the hardness of the cured adhesive layer 32. The incorporation of an inorganic filler also serves to improve the thermal conductivity of the adhesive layer 32. Further, in a case in which an adherend includes glass as a main component, it is possible to allow the sheet 10 to have a linear expansion coefficient close to that of the adherend. This serves to improve a reliability of an apparatus obtained by pasting the sheet 10 to the adherend, and by curing the resultant, if necessary.

Examples of the inorganic filler include: powders of inorganic compounds such as silica, alumina, talc, calcium carbonate, titanium white, red iron oxide, silicon carbide, and boron nitride; beads obtained by spheroidizing the above described powders; single crystal fibers; and glass fibers. Of these, a silica filler and an alumina filler are preferred as the inorganic filler. Further, the adhesive layer 32 may contain, as the inorganic filler, a thermally conductive inorganic filler which can be included in the resin protective layer 30. In this case, it is possible to obtain the same effect as in the case of providing an intermediate resin layer 36, as a thermally conductive layer, which will be described later. The inorganic filler may be used singly, or in combination of two or more kinds thereof.

The inorganic filler is preferably surface modified by (subjected to coupling with) a compound containing a curable functional group.

Examples of the curable functional group include hydroxyl group, carboxyl group, amino group, glycidyl group, epoxy group, ether group, ester group, and groups containing an ethylenically unsaturated bond. Examples of the compound containing a curable functional group include silane coupling agents.

The inorganic filler is more preferably surface modified by a compound containing an energy ray curable functional group, such as a group containing an ethylenically unsaturated bond, because a fracture resistance of the cured adhesive layer 32 (the strength of the cured adhesive layer 32) can be easily maintained. Examples of the group containing an ethylenically unsaturated bond include vinyl group, a (meth)acryloyl group, and maleimide group. Of these, a (meth)acryloyl group is preferred, because of its high reactivity and general versatility.

When the adhesive layer 32 contains an inorganic filler which is surface modified by the compound containing an energy ray curable functional group, for example, the cured adhesive layer will have a high toughness, after subjecting the sheet 10 to three-dimensional molding to be coated on the surface of a molded article.

In a case in which the adhesive layer 32 contains a surface-modified inorganic filler, the adhesive layer preferably contains an energy ray curable component, in addition to the inorganic filler.

The inorganic filler preferably has an average particle size of 1 µm or less, and more preferably 0.5 µm or less. When the inorganic filler has an average particle size within the above range, the light transmittance of the adhesive layer 32 is more easily improved. At the same time, a haze of the sheet 10 (namely, of the adhesive layer 32) can be more easily reduced. The lower limit of the average particle size of the inorganic filler is not particularly limited, but is preferably 5 nm or more.

The average particle size of the inorganic filler is obtained by: observing 20 particles of the inorganic filler by a digital microscope; measuring the maximum diameter and the minimum diameter of each particle of the inorganic filler and averaging the measured values to obtain the diameter of the particle; calculating the mean value of the diameters of 20 particles, to be taken as the average particle size of the inorganic filler.

The content of the inorganic filler is preferably from 0% by mass to 95% by mass, more preferably from 5% by mass to 90% by mass, still more preferably from 10% by mass to 80% by mass, with respect to the total amount of the adhesive layer 32.

The cured adhesive layer 32 preferably has a pencil hardness of HB or more, more preferably F or more, and still more preferably H or more. When the cured adhesive layer 32 has a pencil hardness within the above range, the function of the cured adhesive layer 32 to protect the pseudo-sheet structure 20 is further improved, thereby allowing for a more sufficient protection of the pseudo-sheet structure 20. The pencil hardness as used herein is a value measured in accordance with JIS K5600-5-4.

The adhesive layer 32 may contain a colorant. Incorporation of a colorant allows for obtaining the same effect as in the case of providing the intermediate resin layer 36 as a coloring layer, which will be described later.

The adhesive layer 32 may contain other components. Examples of the other components include known additives such as organic solvents, flame retardants, tackifiers, UV absorbers, antioxidants, antiseptics, fungicides, plasticizers, antifoaming agents, and wettability controlling agents.

The adhesive layer 32 preferably has a thickness of from 3 µm to 150 µm, and more preferably from 5 µm to 100 µm, in terms of adhesion, for example.

(Release Layer)

The release layer 34 has a function to protect the pseudo-sheet structure 20 and the adhesive layer 32 exposed from the pseudo-sheet structure 20 (namely, from between the plurality of the electrically conductive linear bodies 22 included therein), before subjecting the sheet 10 to three-dimensional molding. When the release layer 34 is provided, it is possible to prevent a breakage of the pseudo-sheet structure 20 due to handling, and a reduction in the adhesive strength of the adhesive layer 32. The release layer 34 is peeled off from the sheet 10, when subjecting the sheet 10 to three-dimensional molding.

The release layer 34 is not particularly limited. The release layer 34 preferably includes: a release substrate; and a release agent layer formed by coating a release agent on the release substrate, in terms of ease of handleability, for example. Further, the release layer 34 may include the release agent layer on only one surface of the release substrate, or on both surfaces of the release substrate.

Examples of the release substrate include a paper substrate, a laminated paper obtained by laminating a thermoplastic resin (such as polyethylene) on a paper substrate, and a plastic film. Examples of the paper substrate include a glassine paper, a coated paper, and a cast-coated paper. Examples of the plastic film include films of polyesters such as polyethylene terephthalate, polybutylene terephthalate, and polyethylene naphthalate; and films of polyolefins such as polypropylene, and polyethylene. Examples of the release agent include olefin resins, rubber elastomers (such as butadiene resins, and isoprene resins), long-chain alkyl resins, alkyd resins, fluororesins, and silicone resins.

The thickness of the release layer 34 is not particularly limited. In general, the release layer 34 preferably has a thickness of from 20 µm to 200 µm, and more preferably from 25 µm to 150 µm.

The thickness of the release agent layer in the release layer 34 is not particularly limited. In a case in which the release agent layer is formed by coating a solution containing a release agent on a release substrate, the release agent layer 34 preferably has a thickness of from 0.01 µm to 2.0 µm, and more preferably from 0.03 µm to 1.0 µm.

In a case in which a plastic film is used as the release substrate, the plastic film preferably has a thickness of from 3 μm to 150 in, and more preferably from 5 μm to 100 μm.

(Properties and the Like of Sheet)

In the sheet 10 according to the present embodiment, the total thickness of layers (hereinafter, also referred to as "surface layers of the pseudo-sheet structure 20) provided at the side of the pseudo-sheet structure 20 at which the resin protective layer 30 is provided, is preferably from 1.5 times to 80 times, more preferably from 3 times to 40 times, and still more preferably from 5 times to 20 times the diameter of the electrically conductive linear bodies 22.

By adjusting the total thickness of the surface layers of the pseudo-sheet structure 20 to be equal to or greater than 1.5 times the diameter of the electrically conductive linear bodies 22, it is possible to avoid the bulging of the surface of the resin protective layer 30 (namely, the surface of the sheet) at portions beneath which the electrically conductive linear bodies 22 are present. This applies even when the electrically conductive linear bodies 22 are embedded in a layer(s) (such as the adhesive layer 32, the resin protective layer 30, etc.) adjacent to the side of the resin protective layer 30, after the sheet 10 has been subjected to three-dimensional molding to be coated on a molded article. Further, in a case in which the sheet 10 is used as a heat-generating sheet, a heat-generating efficiency on the surface of the pseudo-sheet structure 20 will be improved.

The total thickness of the surface layers of the pseudo-sheet structure 20 is preferably equal to or less than 80 times the diameter of the electrically conductive linear bodies 22. With this arrangement, when the sheet 10 is used as a heat-generating sheet, the heat-generating sheet serves as a heater which has an excellent heat-generating efficiency, and in which the bulging of the surface of the sheet is prevented.

Here, the resin protective layer 30, and other layers (such as the adhesive layer 32, and another resin layer) provided between the resin protective layer 30 and the pseudo-sheet structure 20, correspond to the surface layers of the pseudo-sheet structure 20, whereas a layer (such as the release layer) provided at the opposite side of the pseudo-sheet structure 20 from the side at which the resin protective layer 30 is provided, does not correspond to the surface layer.

In a case in which a part or the entirety of the pseudo-sheet structure 20 (namely, the electrically conductive linear bodies 22 constituting the pseudo-sheet structure) is embedded in a layer(s) (the adhesive layer 32, in the present embodiment) adjacent to the side at which the resin protective layer is provided, the thickness of the surface layers of the pseudo-sheet 20 refers to the thickness thereof in the region where the pseudo-sheet structure 20 (namely, the electrically conductive linear bodies 22) is not embedded. The same applies for the thickness of each of the layers constituting the surface layers of the pseudo-sheet 20.

In the sheet 10, the ratio (thickness of the resin protective layer 30/thickness of the adhesive layer 32) of the thickness of the resin protective layer 30 to the thickness of the adhesive layer 32 is preferably from 1/1 to 100/1, and more preferably from 2/1 to 50/1, and still more preferably from 3/1 to 20/1.

When the sheet 10 is subjected to three-dimensional molding to be coated on a molded article, the electrically conductive linear bodies 22 can be embedded not only in the adhesive layer 32, but also in a layer(s) (such as the resin protective layer 30) included in the surface layers other than the adhesive layer 32. Accordingly, although the surface layers are preferably thick, increasing the thickness of the adhesive layer is not a sole means for increasing the thickness of the surface layers. Therefore, it is not necessary to increase the thickness of the adhesive layer 32 considering the case in which the electrically conductive linear bodies 22 are embedded therein. In view of the durability of the sheet 10 after being subjected to three-dimensional molding, it is preferable that the adhesive layer 32 is not excessively thick. Thus, the ratio of the thickness of the resin protective layer 30 to the thickness of the adhesive layer 32 is preferably within the above range.

In a case in which each of the electrically conductive linear bodies 22 in the sheet 10 is a linear body including a metal wire coated with a carbon material, the adhesive layer 32 preferably has a peel force of 12 N/25 mm or more, wherein the peel force is measured 30 minutes after pasting the adhesive layer 32 to a stainless steel plate.

When the metal wire is coated with a carbon material, the adhesion between the metal wire and the adhesive layer 32 is reduced. Therefore, when linear bodies including a metal wire are delivered on the surface of the adhesive layer 32 to be fixed thereon, during the production of the sheet 10, the linear bodies including a metal wire are more easily peeled off from the adhesive layer 32. Accordingly, it is preferable to adjust the peel force of the adhesive layer 32 to 12 N/25 mm or more, and to use the adhesive layer 32 having a high adhesion strength.

The peel force of the adhesive layer 32 in this case is more preferably 13 N/25 mm or more. However, the upper limit of the peel force of the adhesive layer 32 is preferably 35N/25 mm or less.

In a case in which each of the electrically conductive linear bodies 22 in the sheet 10 is a linear body including an electrically conductive thread, on the other hand, the adhesive layer 32 preferably has a peel force of 11 N/25 mm or less, wherein the peel force is measured 30 minutes after pasting the adhesive layer 32 to a stainless steel plate. Accordingly, by adjusting the peel force of the adhesive layer 32 to 11 N/25 mm or less and using the adhesive layer 32 having a low adhesion strength, it is possible facilitate the peeling of the electrically conductive linear bodies 22 from the adhesive layer 32, and to facilitate the extension of the electrically conductive linear bodies 22, even in a case in which the electrically conductive linear bodies 22 formed in a wave pattern are straightened and extended following the extension of the sheet 10 due to three-dimensional molding.

The peel force of the adhesive layer 32 in this case is more preferably 10 N/25 mm or less. However, the lower limit of the peel force of the adhesive layer 32 is preferably 2 N/25 mm or less.

The peel force of the adhesive layer 32 in each of the above described cases is measured as follows.

Surface layers (width: 25 mm) including the adhesive layer 32 are prepared, and the surface layers are pasted on a surface of a stainless steel plate, with the adhesive layer 32 facing the stainless steel plate. In this state, a load is applied to the resultant. After a lapse of 30 minutes, the resultant is subjected to the 180° peeling test defined in JIS-Z0237 (2000). Specifically, the surface layers are pulled in a direction of 180° at a velocity of 300 mm/min, using a tensile tester, and a force required to peel the surface layers from the stainless steel plate is measured as the peel force of the adhesive layer 32 in each of the cases. The conditions for applying the load are also in accordance with the above described JIS.

In the sheet 10 according to the present embodiment, the sheet (namely, the pseudo-sheet structure 20 included therein) preferably has a surface resistance ($\Omega/\square=\Omega/sq.$) of 800$\Omega/\square$ or less, more preferably from 0.5$\Omega/\square$ to 500$\Omega/\square$, and still more preferably from 0.8Ω/□ to 300Ω/□. In terms of reducing a voltage to be applied, the sheet 10 having a low surface resistance is required. When the sheet has a surface resistance of 800Ω/□ or less, a reduction in the voltage to be applied can be easily achieved.

The surface resistance of the sheet is measured according to the following method. First, a silver paste is applied on both ends of the pseudo-sheet structure 20 in order to improve electrical connectivity. Subsequently, the sheet 10 is pasted on a glass substrate on both ends of which a copper tape is pasted, such that the silver paste comes in contact with the copper tape. Then the resistance is measured using an electrical tester, and the surface resistance of the sheet is calculated.

(Production Method of Sheet)

The method of producing the sheet 10 according to the present embodiment is not particularly limited. The sheet 10 is produced, for example, through the following steps.

First, a composition for preparing the adhesive layer 32 is coated on the resin protective layer 30 to form a coated film. Then the coated film is dried to prepare the adhesive layer 32. Subsequently, the electrically conductive linear bodies 22 are formed in a predetermined wave pattern. The electrically conductive linear bodies 22 formed in a wave pattern are then arranged and disposed on a laminated body composed of the resin protective layer 30 and the adhesive layer 32 (namely, on the adhesive layer 32 included in the laminated body), thereby forming the pseudo-sheet structure 20. Thereafter, the release layer 34 is pasted at the opposite side of the pseudo-sheet structure 20 from the side at which the adhesive layer 32 is provided, in the resulting laminated body of the resin protective layer 30, the adhesive layer 32 and the pseudo-sheet structure 20.

Alternatively, the sheet 10 may be prepared as follows. First, the electrically conductive linear bodies 22 are arranged to form the pseudo-sheet structure 20. Then the laminated body composed of the resin protective layer 30 and the adhesive layer 32 (namely, the adhesive layer 32 included in the laminated body) and one of the surfaces of the resulting pseudo-sheet structure 20 are pasted together, and the release layer 34 is pasted on the other surface of the pseudo-sheet structure 20, thereby obtaining the sheet 10.

(Application of Sheet)

The sheet 10 according to the present embodiment is used for coating the surface of a molded article which is used in housings for home electrical appliances, interior parts for vehicles, interior materials for building materials, and the like, by utilizing a three-dimensional molding method such as TOM molding, film insert molding, or vacuum molding.

A molded article including a coating layer formed by the sheet 10 as a surface conductor can be used, for example, as a surface conductive article such as a touch panel having a curved surface, or alternatively, a surface heat-generating article such as a heat-generating article for melting ice and snow (such as lighting section of traffic signal), or a heat-generating article for use in a heater (such as a heat-generating interior equipment for automobile).

When the sheet 10 is used as the electrically conductive sheet, it is possible to prevent a decrease in the function of the sheet, even in a case in which a molded article to be coated is a three-dimensional object having a complex shape, as described above.

Accordingly, the sheet 10 can be suitably used for coating a molded article having a complex three-dimensional shape, for example, a molded article having a curved surface.

Note that, in a case in which the sheet 10 according to the present embodiment is used as a heat-generating sheet for use in three-dimensional molding, the sheet 10 is provided, for example, with a power feeding portion (electrodes) for feeding electricity to the pseudo-sheet structure 20, although not shown in the figures. The power feeding portion, for example, is formed using a metallic material, and electrically connected to the end portion of the pseudo-sheet structure 20. The joining together of the power feeding portion and the pseudo-sheet structure 20 is performed such that power can be fed to each of the electrically conductive linear bodies 22 in the pseudo-sheet structure 20, by a known method such as one using a solder.

MODIFIED EXAMPLES

The sheet 10 according to the present embodiment is not limited to the above mentioned embodiment, and modifications and improvements can be made thereto. The modified examples of the sheet 10 according to the present embodiment will now be described. In the description below, when the modified examples of the sheet 10 include the same members as those described in the sheet 10 according to the present embodiment, the same symbols are given to refer to the members, and the description thereof will be omitted or simplified.

First Modified Example

The sheet 10 according to the present embodiment is not limited to the above described configuration, and may have another layer configuration.

For example, the sheet 10 may be a sheet 11, as shown in FIG. 4, which has a basic layer configuration shown in FIG. 2 and which also includes at least one of: 1) the resin layer 36 (hereinafter, also referred to as "intermediate resin layer 36") provided between the resin protective layer 30 and the adhesive layer 32; 2) a resin layer 38 (hereinafter, also referred to as "lower resin layer 38") provided at the opposite side of the pseudo-sheet structure 20 from the side at which the resin protective layer 30 is provided; or 3) a release layer 40 (hereinafter, also referred to as "upper release layer 40") provided at the opposite side of the resin protective layer 30 from the side at which the pseudo-sheet structure 20.

FIG. 4 shows the sheet 11 in which the intermediate resin layer 36, the lower resin layer 38, and upper release layer 40 are further provided to the layer configuration of the sheet 10.

The intermediate resin layer 36 will now be described.

The intermediate resin layer 36 is a layer provided as a functional layer, which serves, for example, as a thermally conductive layer, a coloring layer, a decorative layer, a primer layer, a layer for preventing component migration, and/or the like. A plurality of layers each having any of the functions described above may be provided as the intermediate resin layers 36. Alternatively, the intermediate resin layer 36 may be a monolayer having a plurality of functions.

For example, in a case in which the intermediate resin layer 36 is a thermally conductive layer, the intermediate resin layer 36 is composed of, for example, a layer containing a thermally conductive inorganic filler and a thermoplastic resin. When the intermediate resin layer 36 is a thermally conductive layer, the occurrence of uneven temperature rise (unevenness in the distribution of temperature rise) at the surface of the sheet can be more effectively prevented, in the case of using the sheet 10 as a heat-generating sheet for use in three-dimensional molding. In this case, a layer having a light transmittance may be used as the resin protective layer 30.

Further, in a case in which the intermediate resin layer 36 is a coloring layer, the intermediate resin layer 36 is composed of, for example, a layer containing a colorant and a thermoplastic resin. When the intermediate resin layer 36 is a coloring layer, the resulting sheet has an increased ability to conceal the electrically conductive linear bodies 22. In this case, a layer having a light transmittance may be used as the resin protective layer 30.

Still further, in a case in which the intermediate resin layer is a decorative layer, the intermediate resin layer is composed of a thermoplastic resin layer whose surface is provided with an image(s) (such as a drawing, a letter, a pattern, and/or a design) formed with an image forming material (such as an ink or a toner). The image can be formed by a known printing method such as gravure printing, offset printing, screen printing, ink-jet printing, or heat transfer printing. When the intermediate resin layer is a decorative layer, the sheet 11 can be used as a sheet for use in three-dimensional decoration. In this case, a layer having a light transmittance is used as the resin protective layer 30.

The above described respective components included in the intermediate resin layer 36, and other components, may be the same as those exemplified for the resin protective layer 30.

The intermediate resin layer 36 preferably has a thickness of, for example, from 5 to 1,300 μm, more preferably from 10 to 1,000 μm, and still more preferably from 15 to 900 μm, in terms of three-dimensional moldability, and of securing the respective functions of the resin protective layer 30.

Note, however, that a layer (coloring layer) containing a colorant is not limited to the intermediate resin layer 36, and at least one layer, of layers provided at the side of the pseudo-sheet structure 20 at which the resin protective layer 30 is provided, can be used as the coloring layer.

Further, the layer containing a thermally conductive inorganic filler (thermally conductive layer) is not limited to the intermediate resin layer 36, and at least one layer, of the layers provided at the side of the pseudo-sheet structure 20 at which the resin protective layer 30 is provided, can be used as the thermally conductive layer.

Still further, the decorative layer is not limited to the intermediate resin layer 36, and at least one layer, of the layers provided at the side of the pseudo-sheet structure 20 at which the resin protective layer 30 is provided, can be used as the decorative layer.

The lower resin layer 38 will now be described.

The lower resin layer 38 is a resin layer provided for heat welding the sheet 11 to the surface of a molded article, when the sheet 11 is subjected to three-dimensional molding to be coated on the surface of the molded article. In particular, the sheet 11 including the lower resin layer 38 is suitable for use in a film insertion method, among three-dimensional molding methods.

For example, a layer including a thermoplastic resin is used as the lower resin layer 38. The above described respective components included in the intermediate resin layer 36, and other components, may be the same as those exemplified for the resin protective layer 30. In particular, the lower resin layer 38 is preferably a layer composed of a polyolefin such as polypropylene, a layer composed of an acrylonitrile-butadiene-styrene copolymer, or the like, in terms of improving thermal adhesiveness to a molded article.

The lower resin layer 38 preferably has a thickness of, for example, from 5 to 1,300 μm, more preferably from 10 to 1,000 μm, and still more preferably from 15 to 900 μm, in terms of improving the thermal adhesiveness to a molded article.

The upper release layer 40 will now be described.

The upper release layer 40 has a function to protect the resin protective layer 30 before and during the three-dimensional molding. The upper release layer 40 is peeled off from the sheet 11 after the three-dimensional molding. In particular, the sheet 11 including the upper release layer 40 is suitable for use in a film insertion method, among three-dimensional molding methods. The upper release layer 40 may be peeled off from the sheet 11 before the three-dimensional molding, if necessary.

The upper release layer 40 is not particularly limited, as long as the layer has a resistance to heat during the three-dimensional molding. The upper release layer 40 may have, for example, the same configuration as the release layer 34. In particular, the upper release layer 40 is preferably a layer composed of a heat resistant resin film, or the like, in terms of securing the function to protect the resin protective layer 30, and the resistance to heat during the three-dimensional molding.

In addition to the above, the sheet 10 according to the present embodiment may include, for example, another adhesive layer which is disposed at the opposite side of the pseudo-sheet structure 20 from the side at which the adhesive layer 32 is provided. The sheet 10 may further include another release layer which is disposed at the opposite side of the other adhesive layer from the side at the pseudo-sheet structure 20 is provided.

The first modified example described above is merely an example, and the sheet 10 according to the present embodiment may have any of various configurations, depending on the objective.

For example, although not shown in the figures, the sheet 10 according to the present embodiment may be a sheet in which a plurality of the pseudo-sheet structures 20 are arranged in the direction of the sheet surface (direction along the sheet surface). The plurality of the pseudo-sheet structures may be arranged such that the directions in which the electrically conductive linear bodies 22 extend, of the respective pseudo-sheet structures, are parallel to each other, or perpendicular to each other.

The disclosure of Japanese Patent Application No. 2016-230552 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. An electrically conductive sheet for use in three-dimensional molding, the electrically conductive sheet comprising:
   a structure in which a plurality of electrically conductive linear bodies extending unidirectionally are arranged spaced apart from each other, wherein the electrically conductive linear bodies are arranged such that adjacent electrically conductive linear bodies are regularly spaced apart from each other, an interval between the adjacent electrically conductive linear bodies is from 0.3 mm to 12.0 mm, and each of the electrically conductive linear bodies includes:
   a first portion formed in a wave pattern having a wavelength λ1 and an amplitude A1; and a second portion formed in a wave pattern having a wavelength λ2 and an amplitude A2, at least one of which is different from the wavelength λ1 or the amplitude A1 of the first portion; and a resin protective layer provided at a side of one surface of the structure.

2. The electrically conductive sheet for use in three-dimensional molding according to claim 1, wherein each of the electrically conductive linear bodies is a linear body including a metal wire, or a linear body including an electrically conductive thread.

3. The electrically conductive sheet for use in three-dimensional molding according to claim 1, wherein each of the electrically conductive linear bodies is a linear body including a metal wire coated with a carbon material.

4. The electrically conductive sheet for use in three-dimensional molding according to claim 1, wherein layers including the resin protective layer are provided on the side of the structure at which the resin protective layer is provided, at least one layer of the layers containing a colorant.

5. The electrically conductive sheet for use in three-dimensional molding according to claim 1, wherein layers including the resin protective layer are provided on the side of the structure at which the resin protective layer is provided, at least one layer of the layers containing a thermally conductive inorganic filler.

6. The electrically conductive sheet for use in three-dimensional molding according to claim 1, further comprising a resin layer provided at an opposite side of the structure from the side at which the resin protective layer is provided.

7. The electrically conductive sheet for use in three-dimensional molding according to claim 1, which is a heat-generating sheet for use in three-dimensional molding.

8. The electrically conductive sheet for use in three-dimensional molding according to claim 4, wherein layers including the resin protective layer are provided on the side of the structure at which the resin protective layer is provided, at least one layer of the layers containing a thermally conductive inorganic filler.

9. The electrically conductive sheet for use in three-dimensional molding according to claim 4, further comprising a resin layer provided at an opposite side of the structure from the side at which the resin protective layer is provided.

10. The electrically conductive sheet for use in three-dimensional molding according to claim 5, further comprising a resin layer provided at an opposite side of the structure from the side at which the resin protective layer is provided.

11. The electrically conductive sheet for use in three-dimensional molding according to claim 8, further comprising a resin layer provided at an opposite side of the structure from the side at which the resin protective layer is provided.

12. The electrically conductive sheet for use in three-dimensional molding according to claim 4, which is a heat-generating sheet for use in three-dimensional molding.

13. The electrically conductive sheet for use in three-dimensional molding according to claim 5, which is a heat-generating sheet for use in three-dimensional molding.

14. The electrically conductive sheet for use in three-dimensional molding according to claim 6, which is a heat-generating sheet for use in three-dimensional molding.

15. The electrically conductive sheet for use in three-dimensional molding according to claim 8, which is a heat-generating sheet for use in three-dimensional molding.

16. The electrically conductive sheet for use in three-dimensional molding according to claim 9, which is a heat-generating sheet for use in three-dimensional molding.

17. The electrically conductive sheet for use in three-dimensional molding according to claim 10, which is a heat-generating sheet for use in three-dimensional molding.

18. The electrically conductive sheet for use in three-dimensional molding according to claim 11, which is a heat-generating sheet for use in three-dimensional molding.

19. The electrically conductive sheet for use in three-dimensional molding according to claim 1, further comprising an adhesive layer that is in contact with the structure and interposed between the resin protective layer and the structure.

20. The electrically conductive sheet for use in three-dimensional molding according to claim 19, wherein the adhesive layer is curable.

21. The electrically conductive sheet for use in three-dimensional molding according to claim 1, wherein the resin protective layer contains a thermoplastic resin.

* * * * *